United States Patent
Sweet et al.

(10) Patent No.: US 10,162,390 B2
(45) Date of Patent: Dec. 25, 2018

(54) HYBRID ACOUSTIC EMI FOAM FOR USE IN A PERSONAL COMPUTER

(71) Applicant: Apple Inc., Cupertino, CA (US)

(72) Inventors: Edward T. Sweet, San Francisco, CA (US); Jerzy S. Guterman, Sunnyvale, CA (US); Houtan R. Farahani, San Ramon, CA (US); Justin D. Crosby, Cupertino, CA (US); Daniel K. Boothe, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 123 days.

(21) Appl. No.: 14/997,442

(22) Filed: Jan. 15, 2016

(65) Prior Publication Data
US 2016/0212892 A1 Jul. 21, 2016

Related U.S. Application Data (60) Provisional application No. 62/104,611, filed on Jan. 16, 2015, provisional application No. 62/106,667, filed on Jan. 22, 2015.

(51) Int. Cl.
*G06F 1/16* (2006.01)

(52) U.S. Cl.
CPC .................. *G06F 1/1688* (2013.01)

(58) Field of Classification Search
None
See application file for complete search history.

(56) References Cited

U.S. PATENT DOCUMENTS

| | | | |
|---|---|---|---|
| 3,810,052 A | 5/1974 | Yanaga | |
| 3,898,393 A * | 8/1975 | Digre | H04R 9/02 335/231 |
| 3,938,618 A | 2/1976 | Ambruoso, Sr. | |
| 4,814,566 A | 3/1989 | Sigl | |

(Continued)

FOREIGN PATENT DOCUMENTS

| | | |
|---|---|---|
| CN | 104407670 A | 3/2015 |
| WO | 2005043881 A2 | 5/2005 |

OTHER PUBLICATIONS

International Search Report and Written Opinion; Application No. PCT/US2015/053026; dated Aug. 4, 2016, 39 pages.

(Continued)

*Primary Examiner* — Xanthia C Cunningham
(74) *Attorney, Agent, or Firm* — Dickinson Wright RLLP (57) ABSTRACT

The described embodiments relate to an electronic assembly that includes multiple varied electrical components. In some embodiments, the electronic assembly can include electrical components susceptible to electromagnetic interference (EMI). In one particular embodiment, an antenna can be positioned along an exterior surface of an enclosure of the electronic assembly and another electrical component can be disposed within the enclosure. When the other electrical component is a speaker component, a port or opening for emitting audio output can be protected from EMI by surrounding the port with a conductive gasket that includes a closed cell foam substrate wrapped in an electrically conductive fabric. In some embodiments, the closed cell foam substrate defines a number of perforations that are plated with an electrically conductive material.

17 Claims, 8 Drawing Sheets

(56) References Cited

U.S. PATENT DOCUMENTS

| | | | |
|---|---|---|---|
| 5,406,038 A * | 4/1995 | Reiff | G06F 1/182 |
| | | | 181/167 |
| 5,422,784 A | 6/1995 | Wakahara et al. | |
| 5,424,586 A | 6/1995 | Hattori et al. | |
| 5,719,799 A | 2/1998 | Isashi | |
| 5,943,214 A | 8/1999 | Sato et al. | |
| 6,087,989 A * | 7/2000 | Song | H01Q 9/285 |
| | | | 343/700 MS |
| 6,168,330 B1 | 1/2001 | Okada et al. | |
| 6,392,871 B1 | 5/2002 | Yanase | |
| 6,429,846 B2 | 8/2002 | Rosenberg et al. | |
| 6,447,314 B1 | 9/2002 | Kato et al. | |
| 6,529,370 B1 | 3/2003 | Kamishima | |
| 6,612,668 B2 | 9/2003 | Doan | |
| 6,654,234 B2 | 11/2003 | Landry et al. | |
| 6,697,495 B1 | 2/2004 | Youn | |
| 6,707,666 B1 | 3/2004 | Chuang | |
| 6,788,530 B2 | 9/2004 | Hill et al. | |
| 6,822,635 B2 | 11/2004 | Shahoian et al. | |
| 6,879,293 B2 | 4/2005 | Sato | |
| 6,911,601 B1 | 6/2005 | Gilbert et al. | |
| 6,975,507 B2 | 12/2005 | Wang et al. | |
| 7,407,202 B2 | 8/2008 | Ye et al. | |
| 7,474,117 B1 | 1/2009 | Bandholz et al. | |
| 7,480,132 B2 | 1/2009 | Wu et al. | |
| 7,489,502 B2 | 2/2009 | Hong et al. | |
| 7,495,898 B2 | 2/2009 | Lo et al. | |
| 7,907,399 B2 | 3/2011 | Kim et al. | |
| 7,920,378 B2 | 4/2011 | Mihara et al. | |
| 7,933,123 B2 | 4/2011 | Wang et al. | |
| 7,969,731 B2 | 6/2011 | Yang et al. | |
| 7,984,936 B2 | 7/2011 | Lee | |
| 8,068,059 B2 | 11/2011 | Konishi | |
| 8,081,433 B2 | 12/2011 | Iwata | |
| 8,164,898 B2 | 4/2012 | Chen et al. | |
| 8,208,249 B2 | 6/2012 | Chin et al. | |
| 8,300,389 B2 | 10/2012 | Kang et al. | |
| 8,340,735 B2 * | 12/2012 | Edeler | H04M 1/035 |
| | | | 455/550.1 |
| 8,564,941 B2 | 10/2013 | Watabe et al. | |
| 8,604,931 B1 * | 12/2013 | Veloso | H04M 1/04 |
| | | | 340/5.31 |
| 8,654,524 B2 | 2/2014 | Pance et al. | |
| 8,660,623 B2 | 2/2014 | Man et al. | |
| 8,687,353 B2 | 4/2014 | Murakata | |
| 8,773,846 B2 | 7/2014 | Wang | |
| 8,792,231 B2 | 7/2014 | Derryberry | |
| 9,048,665 B2 | 6/2015 | Wojcik et al. | |
| 9,203,137 B1 * | 12/2015 | Guterman | H01Q 1/2266 |
| 9,276,626 B2 | 3/2016 | Rayner | |
| 9,277,035 B2 | 3/2016 | Sung et al. | |
| 9,411,380 B2 | 8/2016 | Farahani et al. | |
| 9,575,514 B2 | 2/2017 | Robinson et al. | |
| 9,710,023 B2 | 7/2017 | Shi et al. | |
| 2002/0032510 A1 * | 3/2002 | Turnbull | B60R 1/12 |
| | | | 701/49 |
| 2002/0044132 A1 | 4/2002 | Fish | |
| 2002/0044446 A1 | 4/2002 | Layne et al. | |
| 2002/0046879 A1 * | 4/2002 | Barabash | H01Q 1/48 |
| | | | 174/258 |
| 2002/0191808 A1 * | 12/2002 | Croft, III | H04R 9/047 |
| | | | 381/431 |
| 2004/0017735 A1 | 1/2004 | Kotanagi et al. | |
| 2004/0051670 A1 * | 3/2004 | Sato | G06F 1/1616 |
| | | | 343/702 |
| 2004/0057197 A1 | 3/2004 | Hill et al. | |
| 2004/0150486 A1 | 8/2004 | Barr et al. | |
| 2004/0201532 A1 * | 10/2004 | Apostolos | H01Q 7/00 |
| | | | 343/742 |
| 2005/0052833 A1 | 3/2005 | Tanaka et al. | |
| 2005/0052834 A1 | 3/2005 | Tanaka et al. | |
| 2005/0078463 A1 | 4/2005 | Chheda et al. | |
| 2005/0105256 A1 | 5/2005 | Chuang | |
| 2005/0129263 A1 | 6/2005 | Tamura et al. | |
| 2005/0180100 A1 | 8/2005 | Thomason | |
| 2006/0034467 A1 * | 2/2006 | Sleboda | H04R 5/02 |
| | | | 381/86 |
| 2006/0050061 A1 | 3/2006 | Aiken et al. | |
| 2006/0054704 A1 * | 3/2006 | Fitch | G06F 1/1626 |
| | | | 235/472.01 |
| 2006/0104469 A1 * | 5/2006 | Hawker | H04R 1/028 |
| | | | 381/365 |
| 2006/0164799 A1 | 7/2006 | Varela | |
| 2006/0293091 A1 * | 12/2006 | Hawker | H04M 1/03 |
| | | | 455/575.1 |
| 2007/0004241 A1 | 1/2007 | Meier et al. | |
| 2007/0075613 A1 | 4/2007 | Mau | |
| 2007/0116261 A1 * | 5/2007 | Hawker | H04M 1/0202 |
| | | | 379/419 |
| 2007/0216702 A1 | 9/2007 | Takahashi et al. | |
| 2008/0053713 A1 | 3/2008 | Huang et al. | |
| 2008/0164055 A1 | 7/2008 | Wang et al. | |
| 2008/0271288 A1 | 11/2008 | Senatori | |
| 2009/0027849 A1 | 1/2009 | Tanaka | |
| 2009/0032289 A1 | 2/2009 | Timms et al. | |
| 2009/0050402 A1 | 2/2009 | Shinohara et al. | |
| 2009/0079723 A1 | 3/2009 | Wang et al. | |
| 2009/0257207 A1 | 10/2009 | Wang et al. | |
| 2009/0323268 A1 | 12/2009 | Iwata | |
| 2010/0061584 A1 * | 3/2010 | Lin | H04R 1/02 |
| | | | 381/386 |
| 2010/0073241 A1 * | 3/2010 | Ayala Vazquez | H01Q 1/2266 |
| | | | 343/702 |
| 2010/0091442 A1 | 4/2010 | Theobald et al. | |
| 2010/0138763 A1 | 6/2010 | Kim | |
| 2010/0276193 A1 * | 11/2010 | Liu | H01F 10/138 |
| | | | 174/353 |
| 2010/0296243 A1 | 11/2010 | Lu | |
| 2010/0321253 A1 | 12/2010 | Vazquez et al. | |
| 2010/0326720 A1 | 12/2010 | Tsao et al. | |
| 2010/0328182 A1 * | 12/2010 | Wong | H01Q 1/2266 |
| | | | 343/848 |
| 2011/0045881 A1 * | 2/2011 | Lo | G06F 1/1616 |
| | | | 455/575.7 |
| 2011/0051345 A1 | 3/2011 | Watabe et al. | |
| 2011/0094790 A1 | 4/2011 | Lin et al. | |
| 2011/0120901 A1 | 5/2011 | Liu et al. | |
| 2011/0141052 A1 | 6/2011 | Bernstein et al. | |
| 2011/0193459 A1 | 8/2011 | Yang et al. | |
| 2012/0018208 A1 * | 1/2012 | Shimasaki | H01P 1/04 |
| | | | 174/262 |
| 2012/0078627 A1 * | 3/2012 | Wagner | G06F 17/273 |
| | | | 704/235 |
| 2012/0187809 A1 | 7/2012 | Kim | |
| 2012/0194393 A1 * | 8/2012 | Uttermann | H01Q 1/243 |
| | | | 343/702 |
| 2012/0212903 A1 | 8/2012 | Hopkinson et al. | |
| 2012/0223866 A1 * | 9/2012 | Ayala Vazquez | H01Q 1/243 |
| | | | 343/702 |
| 2012/0235942 A1 | 9/2012 | Shahoian et al. | |
| 2012/0285737 A1 * | 11/2012 | Judy | H05K 9/0043 |
| | | | 174/381 |
| 2012/0314378 A1 * | 12/2012 | Liao | G06K 13/0818 |
| | | | 361/747 |
| 2012/0326886 A1 * | 12/2012 | Herman | A61N 1/37229 |
| | | | 340/870.07 |
| 2013/0003280 A1 | 1/2013 | Degner et al. | |
| 2013/0038551 A1 | 2/2013 | Shirai et al. | |
| 2013/0044419 A1 * | 2/2013 | Watanabe | H04M 1/0277 |
| | | | 361/679.01 |
| 2013/0063004 A1 * | 3/2013 | Lai | G06F 1/1688 |
| | | | 312/223.1 |
| 2013/0070951 A1 * | 3/2013 | Tanaka | H04R 1/38 |
| | | | 381/361 |
| 2013/0077217 A1 | 3/2013 | Trzaskos et al. | |
| 2013/0148315 A1 | 6/2013 | Dabov | |
| 2013/0207853 A1 * | 8/2013 | Yamamoto | H01Q 1/002 |
| | | | 343/702 |
| 2013/0241641 A1 | 9/2013 | Zhu et al. | |
| 2013/0265708 A1 | 10/2013 | Mathew et al. | |

(56) References Cited

U.S. PATENT DOCUMENTS

| | | | |
|---|---|---|---|
| 2013/0307736 A1* | 11/2013 | Larsen | H01Q 1/243 343/702 |
| 2013/0329359 A1 | 12/2013 | Andre et al. | |
| 2014/0009344 A1 | 1/2014 | Zhu et al. | |
| 2014/0043744 A1 | 2/2014 | Matsuoka et al. | |
| 2014/0092552 A1 | 4/2014 | Bekele et al. | |
| 2014/0203974 A1* | 7/2014 | Liu | H01Q 1/2266 343/702 |
| 2014/0268517 A1 | 9/2014 | Moon et al. | |
| 2014/0268593 A1 | 9/2014 | DeRosa et al. | |
| 2014/0286522 A1* | 9/2014 | Forbes | H04R 1/02 381/385 |
| 2014/0292588 A1* | 10/2014 | Yoon | H01Q 1/2266 343/702 |
| 2014/0347228 A1 | 11/2014 | Tsang et al. | |
| 2015/0237733 A1* | 8/2015 | Stahr | H05K 1/185 361/761 |
| 2015/0338883 A1 | 11/2015 | Farahani et al. | |
| 2015/0338887 A1 | 11/2015 | Farahani et al. | |
| 2016/0033621 A1* | 2/2016 | Ottenhues | G01S 7/032 342/175 |
| 2016/0105749 A1* | 4/2016 | Qutub | H04R 7/06 381/190 |
| 2016/0202727 A1 | 7/2016 | Lin et al. | |
| 2016/0202735 A1 | 7/2016 | Robinson et al. | |
| 2016/0205766 A1 | 7/2016 | Blum et al. | |
| 2016/0209870 A1 | 7/2016 | Farahani et al. | |
| 2016/0216735 A1 | 7/2016 | Reid et al. | |
| 2016/0216741 A1 | 7/2016 | Farahani et al. | |
| 2016/0219353 A1* | 7/2016 | Whitwell | H03F 3/181 |
| 2016/0259375 A1 | 9/2016 | Andre et al. | |
| 2016/0327980 A1 | 11/2016 | Farahani et al. | |
| 2016/0327986 A1 | 11/2016 | Farahani et al. | |
| 2017/0003718 A1* | 1/2017 | Farahani | G06F 1/1637 |
| 2017/0133743 A1* | 5/2017 | Kato | H01Q 1/2266 |

OTHER PUBLICATIONS

International Patent Application No. PCT/US2015/066637—International Search Report and Written Opinion dated May 30, 2016, 26 pages.

\* cited by examiner

HYBRID ACOUSTIC EMI FOAM FOR USE IN A PERSONAL COMPUTER

CROSS-REFERENCE TO RELATED APPLICATION(S)

This application claims the benefit of priority under 35 U.S.C § 119(e) to i) U.S. Provisional Application No. 62/104,611, filed on Jan. 16, 2015, and titled "HYBRID ACOUSTIC EMI FOAM FOR USE IN A PERSONAL COMPUTER," and ii) U.S. Provisional Application No. 62/106,667, filed on Jan. 22, 2015, and titled "HYBRID ACOUSTIC EMI FOAM FOR USE IN A PERSONAL COMPUTER," the disclosure of each is incorporated herein by reference in its entirety.

FIELD

The described embodiments relate generally to electromagnetic shielding. In particular, the present embodiments relate to methods and apparatuses for shielding an audio assembly having an antenna coupled to an exterior surface of a housing of the audio assembly.

BACKGROUND

As electronic devices are reduced in size while maintaining or increasing in complexity, various components that were conventionally designed with discrete packaging can be integrated into multi-component assemblies. One difficulty faced by designers desiring to group components together is electromagnetic interference (EMI). Because many components emit at least small amounts of EMI, placing components in direct contact can make it substantially more difficult to isolate the integrated components in a way that prevents the components from interfering with one another. Unfortunately, when an electrical component is exposed to EMI emitted by another one of the integrated electrical components, serious component degradation or in some cases even permanent damage to one or more of the integrated components can occur. Components that facilitate wireless transmissions, such as antennas, can be even more susceptible to interference and are oftentimes more likely to cause interference to other nearby electrical components.

SUMMARY

This paper describes various embodiments that relate to methods and apparatus for shielding a speaker assembly from ingress of electromagnetic interference (EMI) through a port opening of the speaker assembly.

In one aspect, an audio assembly is described. The audio assembly may include an assembly housing defining an interior volume and may include an audio port that opens to an audio transducer. The audio assembly may further include a gasket that includes an electrically conductive material, the gasket surrounding the audio port. The audio assembly may further include an antenna disposed along a wall of the assembly housing. In some embodiments, the gasket blocks electromagnetic interference (EMI) emitted by the antenna from passing through the gasket and entering the audio port.

In another aspect, a portable electronic device is described. The portable electronic device may include an enclosure formed from a metal and may include a plurality of openings. The portable electronic device may further include an assembly housing disposed in the enclosure and may include an audio transducer positioned to emit sound through the plurality of openings. The portable electronic device may further include an antenna disposed on the assembly housing. The portable electronic device a gasket disposed on the assembly housing and engaging the enclosure. The gasket may define an acoustic pathway from the audio transducer to the plurality of openings. In some embodiments, the gasket further defines a shield from electromagnetic interference (EMI) emitted by the antenna.

In another aspect, a method for forming a portable electronic device having an enclosure and an antenna is described. The method may include wrapping a foam substrate with an electrically conductive fabric to form a conductive gasket. The method may further include securing the conductive gasket to an audio assembly disposed in the portable electronic device. The audio assembly may include an assembly housing. The method may further include engaging the conductive gasket with the enclosure. In some embodiments, the conductive gasket blocks electromagnetic interference (EMI) emitted by the antenna from passing through the conductive gasket.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

Combination of subassemblies within electrical devices can result in numerous efficiencies and space savings. In many cases, the combined electrical devices can share resources such as power and data inputs, shock protection, and attachment mechanisms. The following disclosure relates to combining an antenna component with another electrical component without degrading either the antenna component or the other electrical component. In the case of a communications antenna that periodically emits high-energy radio frequency (RF) signals, effective grounding and shielding of the components can be particularly important. In particular, when combining the communications antenna with a speaker assembly (or audio assembly), speaker ports (audio ports) of the speaker assembly can be particularly vulnerable to allowing electromagnetic interference (EMI) to enter into the speaker assembly. Unfortunately, materials well-suited for defining an audio pathway, or an acoustic pathway, out of the speaker assembly are often formed of non-electrically conductive materials, such as a closed cell foam or an open cell foam, that do not form an effective barrier against EMI.

One way to mitigate ingress of EMI into the speaker assembly is to utilize a hybrid gasket for protecting the speaker port of an assembly housing of the speaker assembly from the intrusion of EMI. The hybrid gasket may include conductive closed cell foam wrapped in an electrically conductive fabric. By securing the hybrid gasket to an exterior surface of the assembly housing along a perimeter of the opening defined by the speaker port and compressing the hybrid gasket between an interior surface of a device housing and the exterior surface of the assembly housing, the hybrid gasket effectively blocks any direct pathway to the opening defined by the speaker block. The electrical conductivity of the hybrid gasket allows electrically conductive material of the assembly housing to be grounded with the interior surface of the device housing by way of the hybrid gasket. In this way, a faraday cage is created that extends around the assembly housing and the hybrid gasket, effectively preventing EMI emitted by the communications antenna from reaching the speaker assembly and likewise preventing magnetic components associated with the speaker assembly from interfering with the communications antenna.

Use of a foam material, including closed or open cell foam, to form the hybrid gasket also beneficially affects acoustic characteristics of the speaker assembly as the foam material may attenuate audio signals passing through it, thereby effectively confining the audio signal to a desired cavity and/or exit. In this regard, closed or open cell foam formed from the foam material may be referred to as an acoustic sealing foam. One way to make closed cell foam conductive is to perforate a closed cell foam substrate and then plate the perforations with an electrically conductive material (or materials). In some embodiments, the perforations can be selectively arranged within the closed cell foam substrate so that the perforations are concentrated near portions of the closed cell foam substrate that are not covered by the electrically conductive fabric. The conductive perforations can reduce the ingress of EMI through all portions of the hybrid gasket, but are particularly helpful for protecting portions of the closed cell foam not otherwise covered by conductive fabric.

These and other embodiments are discussed below with reference to FIGS. 1-14. However, those skilled in the art will readily appreciate that the detailed description given herein with respect to these figures is for explanatory purposes only and should not be construed as limiting.

Figure 1:
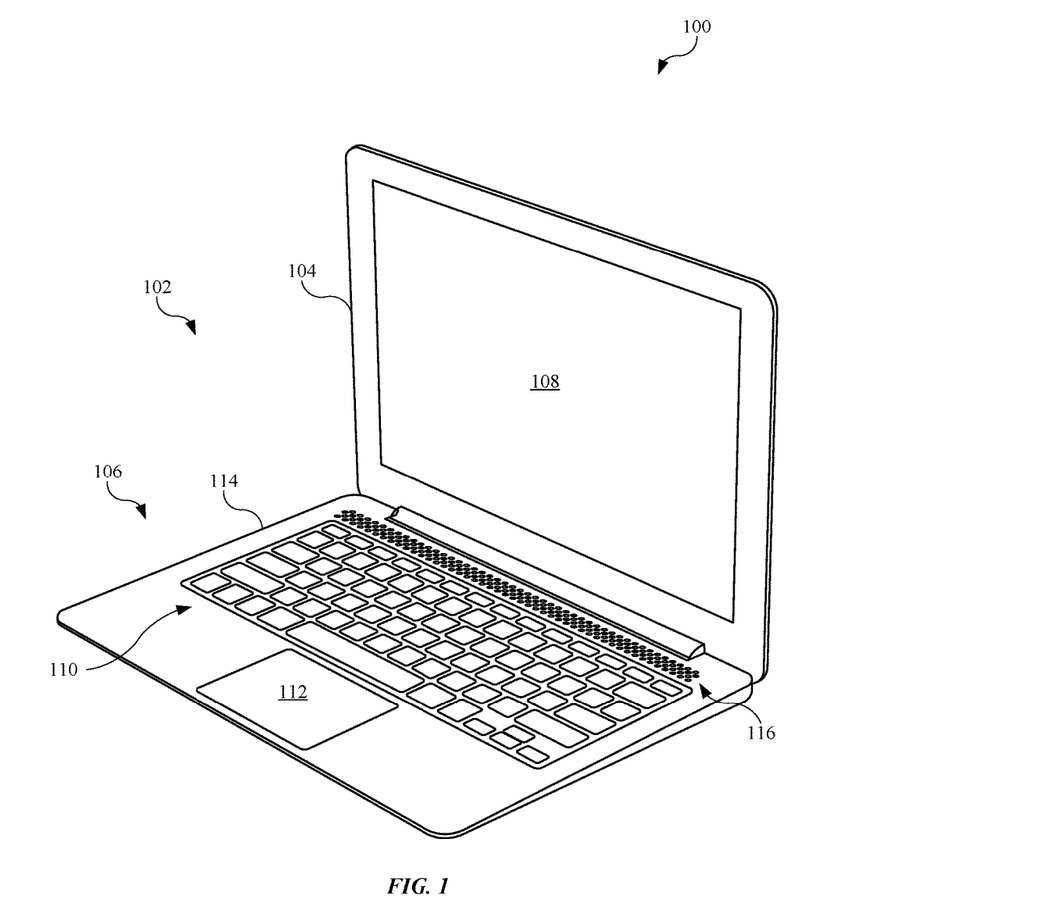
FIG. 1 shows a perspective view of an embodiment of an electronic device, in accordance with the described embodiments.

FIG. 1 shows a perspective view of an embodiment of an electronic device 100, in accordance with the described embodiments. In some embodiments, the electronic device 100 is a mobile wireless communication device, such as a smartphone. In the embodiment shown in FIG. 1, the electronic device 100 is a portable electronic device, such as a laptop computer. As shown, the electronic device 100 may include an enclosure 102 designed to carry several internal components. As shown, the enclosure 102 is formed from a metal that may include aluminum or an aluminum alloy. However, in other embodiments, the enclosure 102 is formed form non-metals, such as plastic.

The enclosure 102 may include a display housing 104 coupled with a base portion 106, with the display housing 104 attached with the base portion 106 in a rotatable manner. The display housing 104 may be designed to carry a display monitor 108 designed to present visual content. The base portion 106 may be designed to carry a keyboard assembly 110 and a touch pad 112, along with several internal components, such as one or more audio speakers (not shown) that emit audible sound. As shown, the base portion 106 may include a top case 114 that includes openings 116, or perforations, extending through the top case 114. Some openings 116 may extend entirely through the top case 114 to allow, for example, audible sound from the audio speakers, or to allow wireless communication between an external device (not shown) and one or more antennae (not shown) disposed near the openings 116. However, some of the openings 116 may extend only partially through the top case 114 to define several blind holes. Also, the openings 116 shown in FIG. 1 may be exaggerated for purposes of illustrations, and the diameter of the openings 116, and accordingly, the openings 116 themselves, may be smaller.

Figure 2:
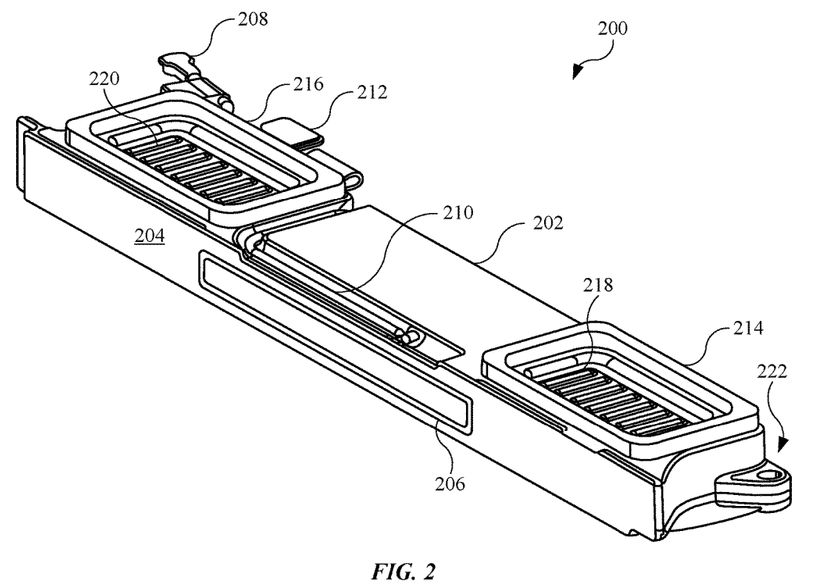
FIG. 2 shows a perspective view of an audio assembly that includes an antenna.

FIG. 2 shows a perspective view of an audio assembly 200 with an embedded antenna. The audio assembly 200 may include an assembly housing 202 to enclosure several components for the audio assembly 200. In some embodiments, the assembly housing 202 is formed from one or more radio transparent materials, such as a polycarbonate ("PC") material (or materials). A "radio transparent" material may be defined as a material (or materials, in some cases) that allows RF transmissions through the material. The RF transmission may include, for example, a frequency on the order of gigahertz ("GHz"), and accordingly, may include RF transmission in the form of Wi-Fi or Bluetooth transmission to and/or from the electronic device 100 (shown in FIG. 1). Also, the assembly housing 202 may include at least one wall covered with a radio opaque conductive layer. A "radio opaque" layer may be defined as a layer that includes a material (or materials) that prevents or blocks RF transmission from passing through the material. The assembly housing 202 can be formed of multiple housing components that can be joined or snapped together to surround audio circuitry disposed within the assembly housing 202.

The assembly housing 202 may include a housing wall 204 provides a surface upon which an antenna 206 can be affixed. The antenna 206 may be suitable for RF transmission for Wi-Fi communication, which may include a wireless communication channel between, for example, the electronic device 100 (shown in FIG. 1) and a router electrically coupled with a modem. Further, the antenna 206 may be suitable for RF transmission for Bluetooth communication, which may include a wireless communication channel between, for example, the electronic device 100 (shown in FIG. 1) and a mouse and/or a keyboard used with the electronic device 100. Accordingly, the antenna 206 may be tuned to receive RF transmission having a frequency of 2.4 GHz or greater in order to communicate wireless with a device external with respect to an electronic device. In some embodiments, the antenna 206 can be formed by selectively depositing electrically conductive material on the housing wall 204 in a geometry suitable for use as an antenna. For example, because a bottom surface of the assembly housing 202 is generally positioned upon an electrically conductive surface (such as a surface associated with a base portion 106 shown in FIG. 1) that shields the bottom surface, the bottom surface of assembly housing 202 can have little or no electrically conductive material deposited thereon. Also, in some embodiments, the housing wall 204 can include no electrically conductive material at all but for the conductive material utilized to form the antenna 206. Further, other walls that form the assembly housing 202 can be fully coated with an electrically conductive material to prevent intrusion of electromagnetic interference (EMI) through the assembly housing 202. In some embodiments, shielding can be placed directly behind the antenna 206 within an interior volume defined by the assembly housing 202 to prevent radiation emitted by the antenna 206 from entering and interfering with circuitry disposed within the assembly housing 202.

The antenna 206 can receive operating power from an internal connector 208 by way of a power conduit 210. In some embodiments, the internal connector 208 can be a dedicated connector serving only to provide power and/or data to and from the antenna 206. Circuitry and other components disposed within the assembly housing 202 can also receive power and data through electrically conductive pathways passing through the assembly housing 202. For example, in some embodiments, the electrically conductive pathways can be embodied by a speaker connector 212, which passes through a slot or opening in the assembly housing 202 so that power and/or data can be transferred to and from electrical components disposed within the assembly housing 202. The audio assembly 200 may also include electrically conductive gaskets that are also configured to provide a well-defined pathway for audio generated by vibration of acoustic membranes (that form audio speakers), causing audible sound from the acoustic membranes to pass out of an electronic device housing (such as the enclosure 102 shown in FIG. 1) within which the audio assembly 200 is disposed. For example, as shown in FIG. 2, the audio assembly 200 may include a first conductive gasket 214 and a second conductive gasket 216 that provide an acoustic pathway for audio generated by vibration of acoustic membranes from a first acoustic membrane 218 and a second acoustic membrane 220, respectively. The first acoustic membrane 218 may be part of a first audio transducer (not shown) disposed in the assembly housing 202, and the second acoustic membrane 220 may be part of a second audio transducer (not shown) and a second audio transducer (not shown) disposed in the assembly housing 202. Also, both the first acoustic membrane 218 and the second acoustic membrane 220 may be formed from a non-electrically conductive material.

In some embodiments, the first conductive gasket 214 and the second conductive gasket 216 are formed primarily of closed cell foam. The assembly housing 202 may include a first port (or opening) and a second port that open to receive the first acoustic membrane 218 and the second acoustic membrane 220, respectively. Accordingly, the first port and the second port may be referred to as a first audio port and a second audio port, respectively. Also, the assembly housing 202 may include a fastening feature 222 formed at one end of the assembly housing 202 and configured to receive a fastener for securing the audio assembly 200 to an electronic device housing. Further, in some embodiments, the antenna 206 is replaced by an operational component that emits EMI. However, the conductive gaskets may nonetheless prevent or mitigate EMI from interfering with the audio transducers.

Figure 3:
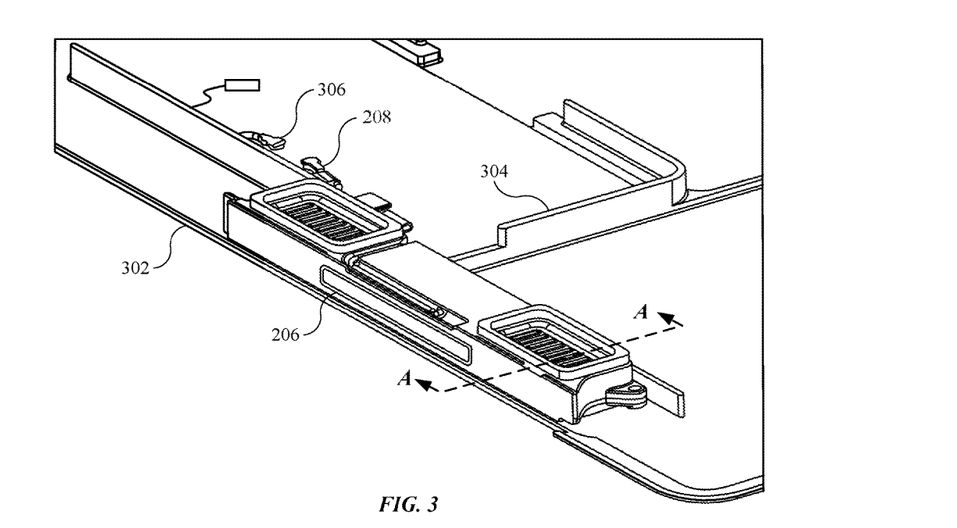
FIG. 3 shows a perspective view of the audio assembly secured to a bottom case of an electronic device.

FIG. 3 shows a perspective view of the audio assembly 200 secured to a bottom case 302 of an electronic device. The bottom case 302 may be designed to mate and couple with the top case 114 of the electronic device 100 (shown in FIG. 1) to enclose components such as the audio assembly 200. In this regard, the audio assembly 200 may be positioned in an electronic device such that the audio assembly 200 may generate audio transmission that leaves the openings 116 (shown in FIG. 1) that extend entirely through the top case 114. Further, the electronic device 100 (shown in FIG. 1) may include two or more audio assemblies, each of which is substantially similar to that of the audio assembly 200. Also, the bottom case 302 can be formed of a radio opaque material that may include aluminum or an aluminum alloy, similar to that of the enclosure 102 (shown in FIG. 1).

The bottom case 302 includes a number of internal walls 304 that subdivide internal components supporting an electronic device associated with the audio assembly 200. For example, the internal walls 304 may define a slot or partial opening to receive an audio assembly 200. The bottom case 302 may also receive an internal connector 306 designed to engage and electrically couple with the internal connector 208 to provide battery power or externally supplied power to drive speakers and antennas of audio assembly 200. In some embodiments, the internal connector 208 and the internal connector 306 can transfer both power and data between circuitry installed within the bottom case 302 and/or the audio assembly 200. Also, in some embodiments, the internal connector 306 electrically couples and/or syncs the antenna 206 to a second antenna (not shown) disposed within or in communication with circuitry associated with the bottom case 302. In some embodiments, the second antenna can be part of a second audio assembly (not shown) having an antenna similar to that of the antenna 206 that cooperates with the antenna 206 to receive and transmit wireless communications for an associated electronic device.

Figure 4:
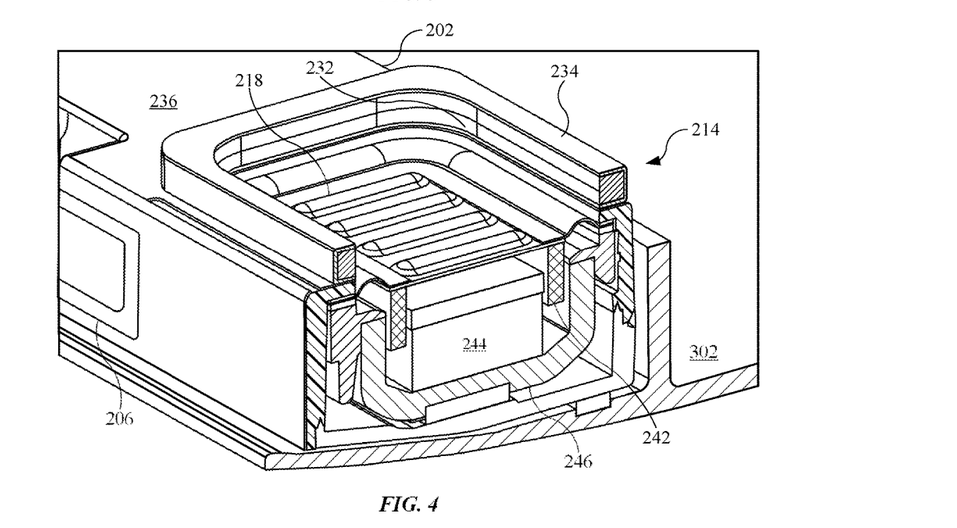
FIG. 4 shows an enlarged cross sectional view of the audio assembly and the bottom case shown in FIG. 3, taken along line A-A.

FIG. 4 shows an enlarged cross sectional view of the audio assembly 200 and the bottom case 302 shown in FIG. 3, taken along line A-A. Primarily, a partial cross sectional view of configuration of the first conductive gasket 214 is depicted. However, the configuration of the second conductive gasket 216 (shown in FIG. 2) may be substantially similar to that of the first conductive gasket 214. As shown, the first conductive gasket 214 is formed from a substrate 232 substantially surrounded by an electrically conductive fabric 234 in the form of a "U" shape. The substrate 232 may include a closed cell foam substrate. The electrically conductive fabric 234 may prevent or reduce an amount of electromagnetic interference (EMI) passing through the substrate 232 and into the assembly housing 202 through the first acoustic membrane 218. A top wall of the assembly housing 202 can be covered by an electrically conductive layer 236, thereby preventing EMI from passing through the top wall of the assembly housing 202. In some embodiments, a thickness and positioning of the electrically conductive layer 236 can be selectively placed upon the assembly housing 202 to align with a pattern of RF energy emitted by the antenna 206.

Also, the first acoustic membrane 218 may include an audio transducer configured to vibrate the first acoustic membrane 218 for generation of audible signals. The audio transducer may include a permanent magnet 242 and electromagnet 244. The audio transducer can also include circuitry configured to convert audio signals received into audible sound by modulating an amount of current supplied to the electromagnet 244. The permanent magnet 242 and/or electromagnet 244 may, at least periodically, generate magnetic fields that, without proper shielding, could cause electromagnetic interference that adversely affects operation of the antenna 206. In this regard, the audio transducer can also include a metallic shunt 246 designed to concentrate magnetic field emitted by permanent magnet 242 in a direction toward the electromagnet 244. Further, in some embodiments, the permanent magnet 242 and/or the electromagnet 244 may emit a magnetic field (not shown) that may extend beyond the first acoustic membrane 218. However, in addition to the first conductive gasket 214 not only preventing EMI from reaching the audio assembly 200, but the first conductive gasket 214 may also prevent the magnetic field from extending to, and interfering with, the antenna 206.

Figure 5:
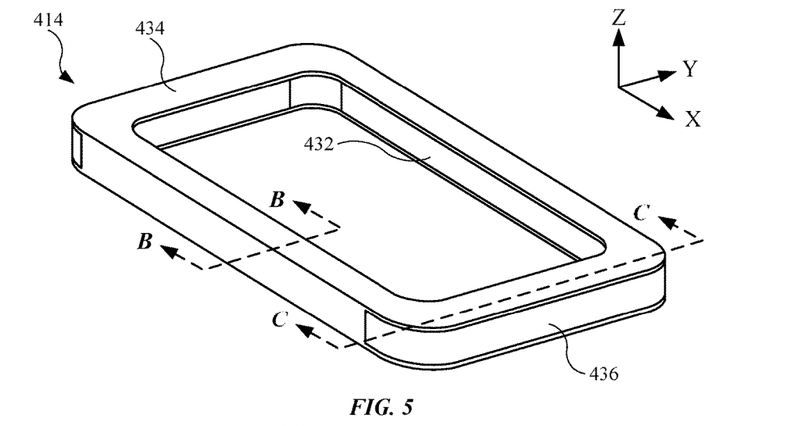
FIG. 5 shows a perspective view of an embodiment of a conductive gasket, in accordance with the described embodiments.

FIG. 5 shows a perspective view of an embodiment of a conductive gasket 414, in accordance with the described embodiments. The conductive gasket 414 shown in FIG. 5 may be used with an audio assembly 200 in place of the first conductive gasket 214 (shown in FIG. 2). An additional conductive gasket similar to the conductive gasket 414 may also replace the second conductive gasket 216 (shown in FIG. 2). As depicted, the conductive gasket 414 may include a fabric-over-foam configuration. For example, an electrically conductive fabric 434 may wrap at least partially around a substrate 432, which may include a closed cell foam substrate. However, opposing ends of the substrate 432 may remain partially uncovered by the electrically conductive fabric 434. For example, the substrate 432 may include a first end 436 defining a first exposed end and a second end (not shown) opposite the first end 436 to define a second exposed end, with the exposed ends uncovered by the electrically conductive fabric 434. In some cases, a conventional closed cell foam substrate would allow EMI to pass through the conductive gasket 414 due in part to the substrate 432 being at least partially uncovered by the electrically conductive fabric 434 at the exposed ends of the substrate 432. However, the electrically conductive fabric 434 may be modified to overcome issues related to EMI transmission.

Figure 6:
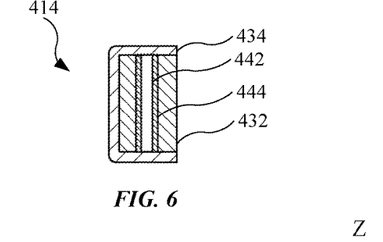
FIG. 6 illustrates a cross sectional views of the conductive gasket shown in FIG. 5, taken along lines B-B.

For example, FIG. 6 illustrates a cross sectional view of the conductive gasket 414 shown in FIG. 5, taken along line B-B, showing how the substrate 432 can be perforated and plated to prevent or at least reduce an amount of EMI that passes through the exposed ends of the substrate 432. The substrate 432 may include several through holes. A "through hole" may be defined as an opening that extends completely through a structure. For example, as shown in FIG. 6, the substrate 432 may include a first through hole 442 that passes entirely through the substrate 432. The first through hole 442 may include an inner surface defining a generally cylindrical shape. However, the inner surface of the through holes may vary to include three or more discrete sides. Further, the first through hole 442 may include a plated surface 444 formed from an electrically conductive material, such as metal. Accordingly, the first through hole 442 may be electrically conductive.

Figure 7:
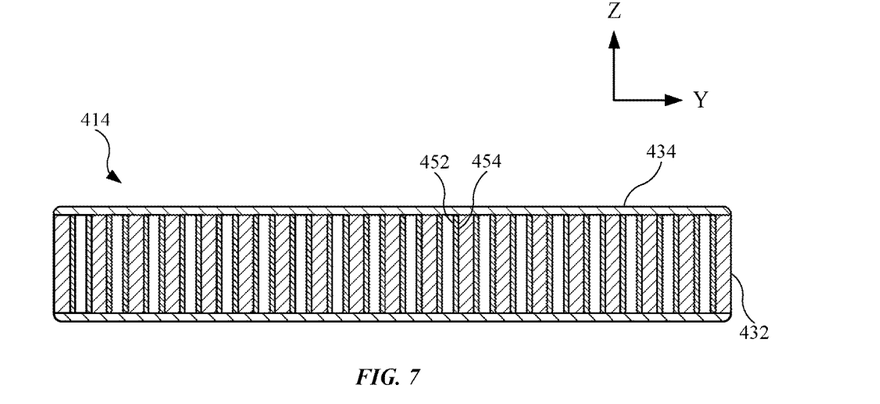
FIG. 7 illustrates a cross sectional views of the conductive gasket shown in FIG. 5, taken along lines C-C.

FIG. 7 illustrates a cross sectional view of the conductive gasket 414 shown in FIG. 5, taken along line C-C, showing the substrate 432 having several through holes. Each through hole shown in FIG. 7 may be similar to that of the first through hole 442 (shown in FIG. 6). Accordingly, each of the through holes shown in FIG. 7 may include a plated surface similar to that of the plated surface 444 (shown in FIG. 6). For example, as shown in FIG. 7, the substrate 432 may include a second through hole 452 that includes a plated surface 454 formed from an electrically conductive material. The second through hole 452 and the plated surface 454 may be representative the remaining through holes and plated surfaces, respectively. Also, the through holes may be aligned in the z-axis at an interval that prevents EMI emitted by an antenna (such as the antenna 206, shown in FIG. 2) from passing through the exposed ends of the substrate 432 the remain uncovered by the electrically conductive fabric 434, while the portions of the substrate 432 covered by the electrically conductive fabric 434 are shielded from EMI by both the electrically conductive fabric 434 and plated through holes. In some embodiments, the through holes can be offset from one another to increase a flexibility or elasticity of the substrate 432.

Figure 8:
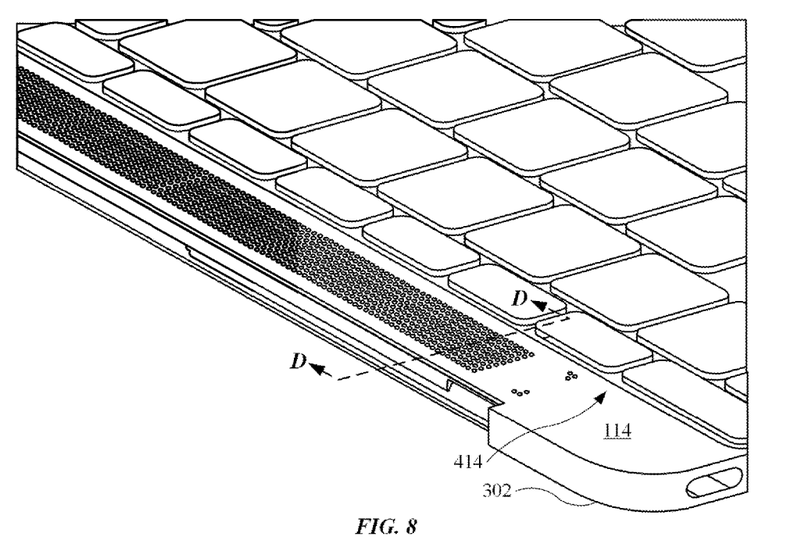
FIG. 8 shows a perspective view of a top case secured with a bottom case to enclose an audio assembly, in accordance with the described embodiments.

FIG. 8 shows a perspective view of a top case 114 secured with a bottom case 302 to enclose an audio assembly 200 (shown in FIG. 2). The top case 114 may define a number of key openings through which pressable keys of the keyboard assembly 110 can pass. The top case 114 may also define the openings 116, with the openings 116 including least two sets of speaker openings extending through the top case 114 in order to provide outlets for audio generated by a pair of audio assemblies similar to that of the audio assembly 200 (shown in FIG. 2).

Figure 9:
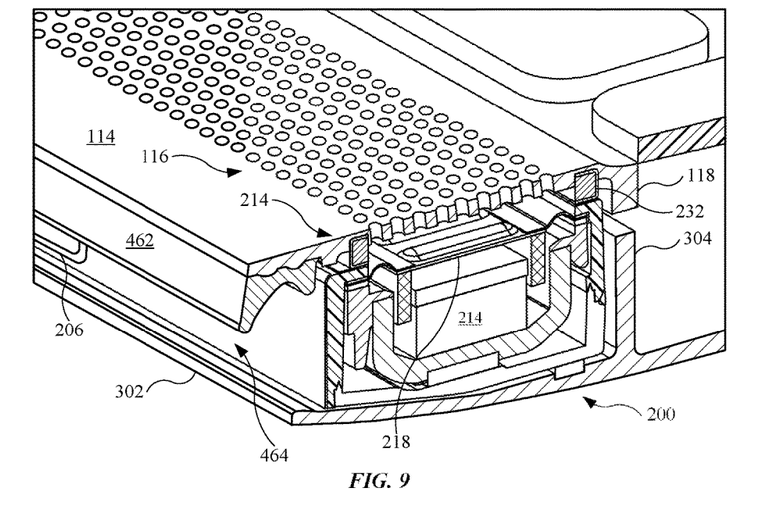
FIG. 9 shows an enlarged cross sectional view of audio assembly, the top case, and the bottom case shown in FIG. 8, taken along line D-D.

FIG. 9 shows an enlarged cross sectional view of the audio assembly 200, the top case 114, and the bottom case 302 shown in FIG. 8, taken along line D-D. The cross sectional view in FIG. 9 further shows the audio assembly 200 and various components of the audio assembly 200 positioned within the top case 114 and the bottom case 302. The top case 114 may include a mask 462 at least partially masking an opening 464 proximate to the audio assembly 200. The opening 464 may provide an RF pathway through which signals can leave and arrive at the antenna 206. In some embodiments, the mask 462 is formed of a radio transparent material so that RF energy can pass unobstructed through the opening 464 defined by bottom case 302 and the top case 114.

FIG. 9 further shows how the first conductive gasket 214 engages a channel defined by the top case 114. The first conductive gasket 214 and the top case 114 can cooperate to prevent EMI from entering the audio assembly 200 through the first acoustic membrane 218 by sealing an audio pathway between the audio assembly 200 and openings 116 of the top case 114. Also, the first conductive gasket 214 may compress based on opposing force received by the top case 114 and the bottom case 302. Also, the internal walls 304 of the bottom case 302 can cooperate with a protrusion 118 of the top case 114 to shield most portions of an interior volume defined by the top case 114 and bottom case 302 from EMI emitted by the antenna 206. Because the substrate 232, which may be formed from closed cell foam, does not tend to absorb audio signals emitted by the first acoustic membrane 218, the substrate 232 also efficiently conducts audio waves from the first acoustic membrane 218 out through the openings 116 that fully extend through the top case 114.

FIGS. 10-13 illustrate alternate embodiments audio assemblies used with the electronic device 100 (shown in FIG. 1). The gaskets shown and described in FIGS. 10-13 may vary with respect to the conductive gasket. Also, for purposes of simplicity, some features of the audio assemblies may be removed.

Figure 10:
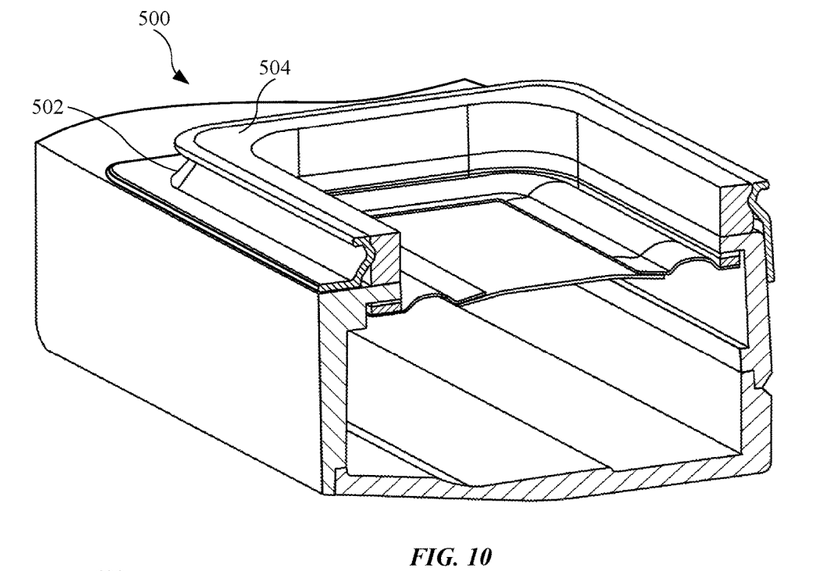
FIG. 10 shows a partial cross sectional view of an embodiment of an audio assembly having a first gasket surrounding a second gasket, in accordance with the described embodiments.

FIG. 10 shows a partial cross sectional view of an embodiment of an audio assembly 500 having a first gasket 502 surrounding a second gasket 504, in accordance with the described embodiments. In some embodiments, the first gasket 502 includes a flexible silicone. As depicted, the first gasket 502 can be curved to both accommodate compression of the audio assembly 500 against an internal surface of an electronic device housing (previously shown) and to position a broad flat surface of first gasket 502 against the internal surface for a robust seal. Also, in some embodiments, the second gasket 504 includes electrically conductive foam. Also, for purposes of acoustic performance, the second gasket 504 is generally formed from a closed cell foam substrate to reduce an amount of sound that escapes into other portions of the electronic device housing. Also, the audio assembly 500 shown in FIG. 10 allows the first gasket 502 to create an air seal between the audio assembly 500 and an internal surface of a device housing. Also, in some embodiments, the second gasket 504 includes several through holes (not shown), with each through hole having a plated surface formed from an electrically conductive material. In other words, the second gasket 504 may be modified to include plated perforations previously described (see, for example, FIGS. 5-7), which may form a faraday cage surrounding the audio assembly 500 to continue entirely around the second gasket 504. This may prevent EMI penetration through a housing of the audio assembly 500.

Figure 11:
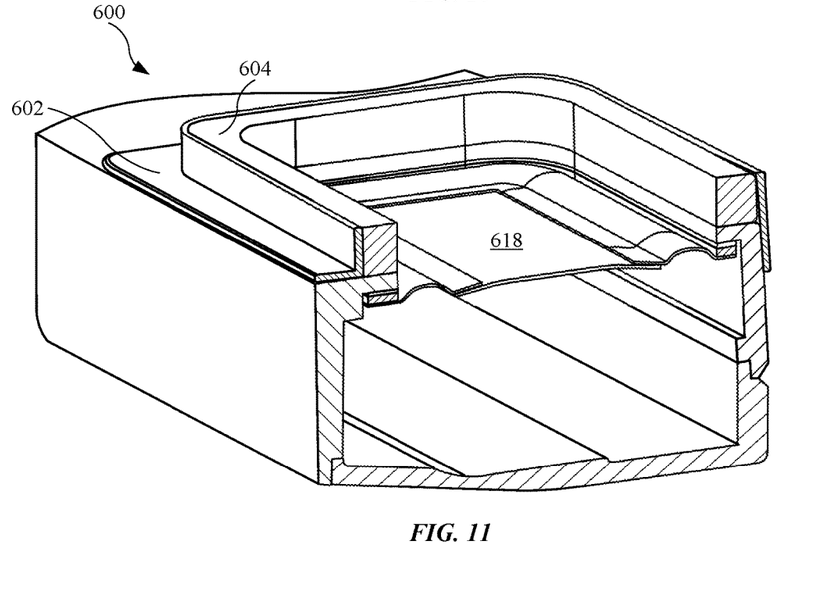
FIG. 11 shows a partial cross sectional view of an alternate embodiment of an audio assembly, in accordance with the described embodiments.

FIG. 11 shows a partial cross sectional view of an alternate embodiment of an audio assembly 600, in accordance with the described embodiments. The first gasket 602 and the second gasket 604 may include any material (or materials) previously described for a first and second gasket (for example, as shown and described in FIG. 10). As shown in FIG. 11, a first gasket 602 may surround a second gasket 604. Also, the first gasket 602 may define an "L-shaped" configuration in one portion, and may also define a flat configuration in another portion. This configuration may be preferable in order to provide an enhanced acoustic seal for the audio assembly 600 in response to vibration of an acoustic membrane 618. The configuration depicted in FIG. 11 may be preferable when the first gasket 602 is formed from particularly flexible material and when the second gasket 504 (in FIG. 10) and the second gasket 604 (in FIG. 11) substantially seals to the interior surface of the housing. It should be noted that while the gaskets are not surrounded by a conductive fabric (such as the electrically conductive fabric 234, shown in FIGS. 5-7), in some embodiments, a conductive fabric wraps around one or more of the gaskets shown in FIGS. 10 and 11.

Figure 12:
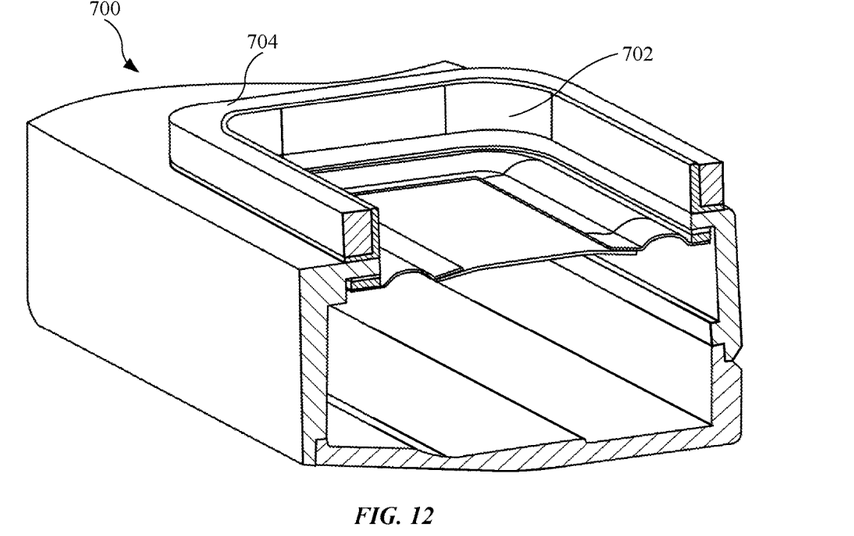
FIG. 12 shows a partial cross sectional view of an embodiment audio assembly having a first gasket positioned on an interior portion of a second gasket, in accordance with the described embodiments.

FIG. 12 shows a partial cross sectional view of an embodiment audio assembly 700 having a first gasket 702 positioned on an interior portion of a second gasket 704, in accordance with the described embodiments. In other words, the second gasket 704 may surround the first gasket 702. The first gasket 702 and the second gasket 704 may include any material (or materials) previously described for a first and second gasket (for example, as shown and described in FIG. 10). In the configuration shown in FIG. 12, the first gasket 702 can have a greater effect on audio attenuation than the second gasket 704, as the first gasket 702 defines the pathway through which audio signals pass during operation of the audio assembly 700. Additionally, the first gasket 702 can be a conductive gasket so that the first gasket 702 passes electrical current between an exterior surface of an electrically device housing of the audio assembly 700 to an interior surface of the electrical device housing. In such a configuration, the second gasket 704 can be embodied as a closed cell or open cell foam as the second gasket 704 is not directly exposed to the audio signals exiting the audio assembly and would not tend to attenuate the audio signal.

Figure 13:
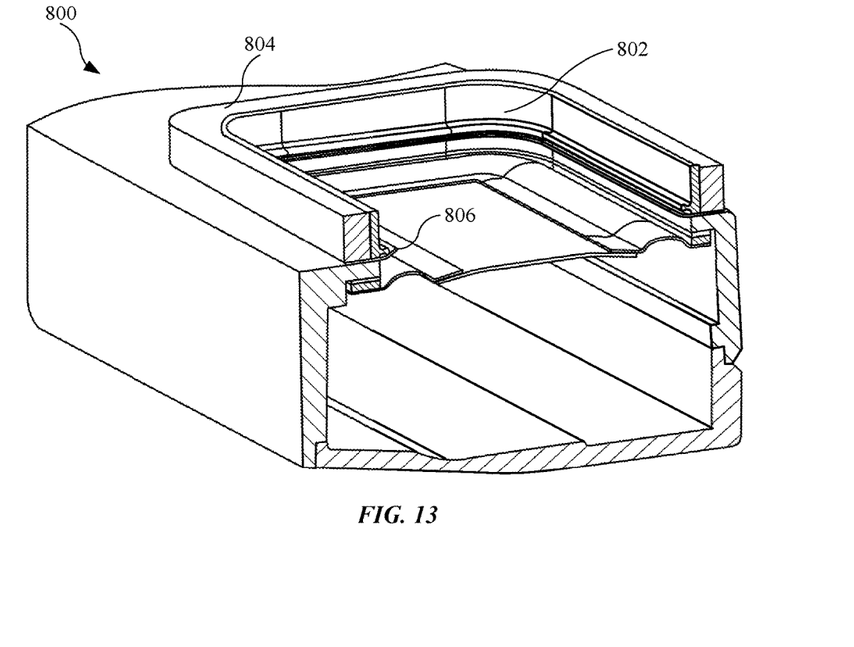
FIG. 13 shows a partial cross sectional view of an alternate embodiment of an audio assembly, in accordance with the described embodiments.

FIG. 13 shows a partial cross sectional view of an alternate embodiment of an audio assembly 800, in accordance with the described embodiments. As shown, the audio assembly 800 may include a first gasket 802 surrounded by a second gasket 804, each of which may include any material (or materials) previously described for a first and second gasket (for example, as shown and described in FIG. 10). Also, the first gasket 802 may include a flexible lip 806 extending from an interior portion of the first gasket 802. In some embodiments, the flexible lip 806 can help to direct audio signals towards a central portion of a central opening defined by the first gasket 802. By moving the audio signal towards the central portion of the central opening some reduction in audio signal attenuation can be achieved by a reducing an amount of interaction between surfaces of the first gasket 802 that define the central opening. It should be noted that the flexible lip 806 could be included in any of the previously described embodiments.

Figure 14:
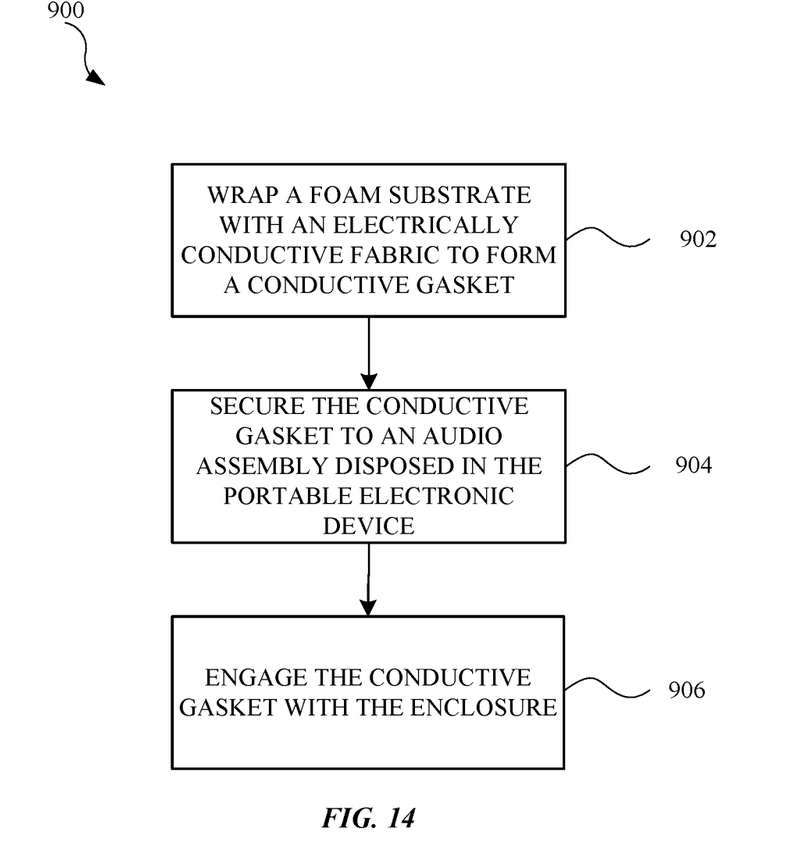
FIG. 14 shows a flowchart representing a method for forming a portable electronic device having an enclosure and antenna, in accordance with the described embodiments.

FIG. 14 shows a flowchart 900 representing a method for forming a portable electronic device having an enclosure and antenna, in accordance with the described embodiments. In step 902, a foam substrate with an electrically conductive fabric to form a conductive gasket. The foam substrate may be a closed cell foam substrate. Also, the foam substrate may include one or more through holes extending through the foam substrate, with each through hole receiving a plated surface formed from an electrically conductive material. Also, the electrically conductive fabric may extend partially around the foam substrate to define a "U" shape configuration. Further, the electrically conductive fabric may extend partially around the foam substrate such that the ends of the foam substrate are not exposed to the electrically conductive fabric.

In step 904, the conductive gasket is secured to an audio assembly disposed in the portable electronic device. The audio assembly may include several features, such as comprising assembly housing and at least one audio transducer designed to emit audio sound. The audio transducer may emit the audible sound from the assembly housing via an audio port in the assembly housing. Also, the conductive gasket may surround the audio port and define an audio pathway for the audio transducer.

In step 906, the conductive gasket engages the enclosure. The enclosure may be formed from a metal, such as aluminum or an aluminum alloy. Also, in some embodiments, the enclosure includes a top case and a bottom case, with the top case having several openings. Some of the several opening may be positioned in the top case such to further define the audio pathway in conjunction with the conductive gasket. Also, in some embodiments, the antenna is secured with the assembly housing. However, with the antenna disposed within the enclosure, and in particular, between the top case and the bottom case, the conductive gasket may block electromagnetic interference (EMI) emitted by the antenna from passing through the conductive gasket.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An audio assembly, comprising:
    an assembly housing comprising walls that define a port, wherein at least one wall of the assembly housing has an opening defined by the port;
    an audio speaker positioned in the port; and
    a gasket comprising a foam ring and an electrically conductive fabric at least partially surrounding the foam ring, the gasket positioned on the assembly housing and surrounding the opening,
    wherein the gasket shields the audio speaker from electromagnetic interference (EMI) generated externally to the assembly housing.

2. The audio assembly of claim 1, wherein the gasket comprises:
    a hole extending through the foam ring; and
    a plated surface defining an inner surface of the hole, the plated surface formed from an electrically conductive material, the plated surface preventing the EMI from passing through the hole.

3. The audio assembly of claim 2, wherein a portion of the foam ring remains uncovered to define an uncovered portion of the foam ring, and wherein the hole and the plated surface are positioned in the uncovered portion.

4. The audio assembly of claim 1, further comprising an antenna positioned outside of the assembly housing on the walls, wherein the walls comprise:
    a first wall through which the opening is formed; and
    a second wall different from the first wall, wherein the antenna is positioned on the second wall, and wherein the gasket shields the audio speaker at the opening from the EMI caused by EM energy from the antenna.

5. The audio assembly of claim 4, wherein the assembly housing is formed of non-conductive material and wherein portions of the assembly housing are covered with conductive material that shields portions of the assembly housing from the EMI emitted by the antenna.

6. The audio assembly of claim 4, wherein the audio speaker further comprises a magnet that emits a magnetic field, and wherein the gasket blocks the magnetic field emitted by the magnet from passing through the gasket and interfering with the antenna when the antenna is active.

7. The audio assembly of claim 1, wherein the audio speaker comprises an acoustic membrane covering the port, and wherein the acoustic membrane is non-electrically conductive.

8. A portable electronic device, comprising:
    an enclosure comprising a plurality of openings, the enclosure defining an internal volume;
    an assembly housing disposed in the internal volume, the assembly housing comprising a first wall and a second wall, the assembly housing further defining an audio port that defines an opening that is aligned with the plurality of openings;
    an audio transducer positioned in the audio port;
    an antenna disposed on the first wall, the antenna external to the audio port; and
    a gasket disposed on the second wall, the gasket comprising a foam ring and an electrically conductive fabric at least partially surrounding the foam ring and engaged with an interior surface of the enclosure, wherein the gasket surrounds the opening and engages the enclosure, wherein the gasket defines an acoustic pathway from the audio transducer to the plurality of openings, and wherein the gasket further defines a shield from electromagnetic interference (EMI) caused by EM energy emitted by the antenna.

9. The portable electronic device of claim 8, wherein the gasket further comprises:
    a hole extending through the foam ring; and
    a plated surface defining an inner surface of the hole, the plated surface formed from an electrically conductive material, the plated surface preventing the EMI from passing through the hole.

10. The portable electronic device of claim 8, wherein:
the enclosure comprises a top case and a bottom case, the top case and the bottom case formed from a metal,
the top case comprises the plurality of openings, and
the bottom case comprises internal walls that receive the assembly housing.

11. The portable electronic device of claim 10, further comprising a mask extending from the top case, wherein the top case and the bottom case define an opening that allows the antenna to communicate with a device external with respect to the enclosure, and wherein the mask at least partially hides the antenna.

12. The portable electronic device of claim 8, wherein the enclosure further comprises:
a display housing that carries a display monitor;
a base portion rotatably coupled with the display housing, the base portion comprising a top case, wherein the plurality of openings are formed in the top case; and
a keyboard assembly and a touch pad, the keyboard assembly and the touch pad carried by the base portion.

13. A method for forming a portable electronic device having an enclosure and an antenna, the method comprising:
providing a conductive gasket comprising:
a substrate comprising a foam ring, and
an electrically conductive fabric at least partially surrounding the foam ring;
securing the conductive gasket to an assembly housing, the assembly housing comprising walls that define a port that receives an audio speaker, wherein at least one wall has an opening that is defined by the port;
securing the antenna with the walls, wherein the antenna is external with respect to the port; and
engaging the conductive gasket with the enclosure, wherein the conductive gasket surrounds the opening and shields the audio speaker from electromagnetic interference (EMI) caused by EM energy emitted by the antenna.

14. The method of claim 13, wherein the audio speaker comprises a magnet that emits a magnetic field, and wherein the conductive gasket blocks the magnetic field emitted by the magnet from passing through the conductive gasket and interfering with the antenna when the antenna is active.

15. The method of claim 13, wherein providing the conductive gasket comprises:
covering only a portion of the substrate with the electrically conductive fabric to defined an exposed end of the substrate that is free of the electrically conductive fabric.

16. The method of claim 15, wherein the foam substrate comprises a hole, and wherein the hole comprises a plated surface formed from an electrically conductive material.

17. The method of claim 16, wherein the hole is positioned in the substrate proximate the exposed end of the substrate.

* * * * *